May 7, 1929.  E. E. SLICK  1,712,233
PLATE MOLD AND METHOD OF MAKING PLATES
Filed Oct. 12, 1927
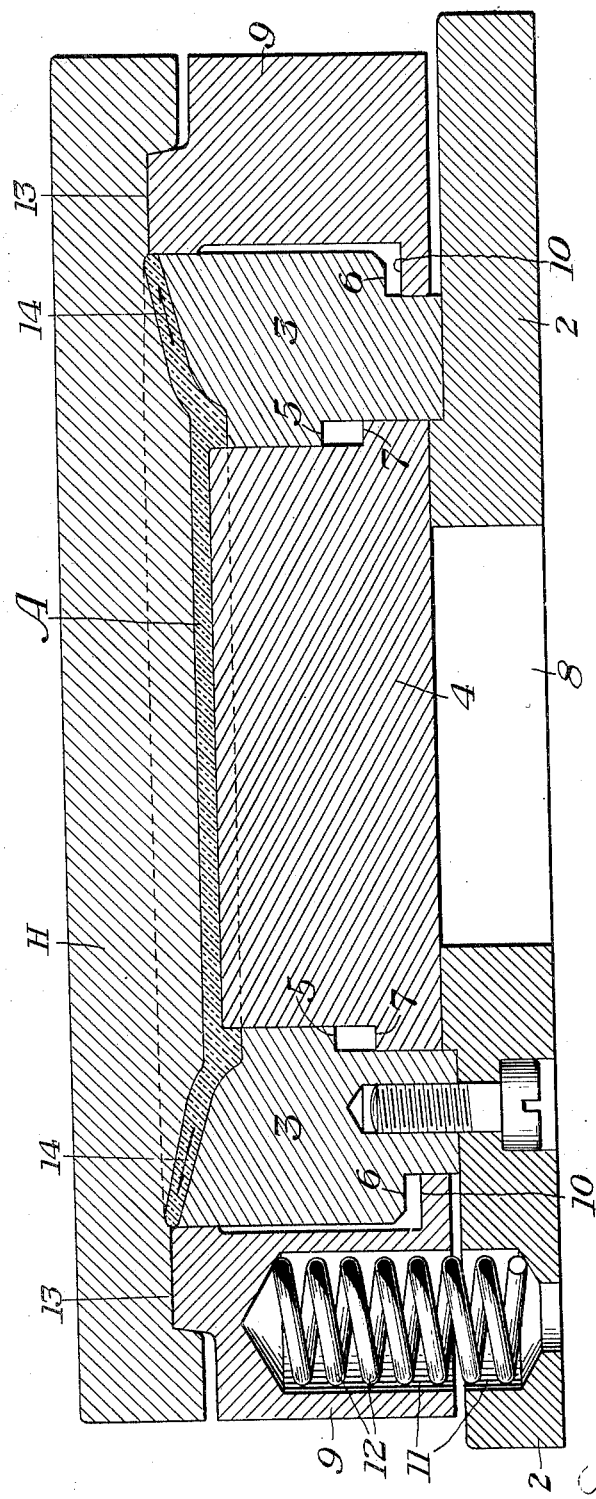
INVENTOR
Edwin C. Slick,
by Byrnes, Stebbins & Parmelee
his Attys.

Patented May 7, 1929.

1,712,233

UNITED STATES PATENT OFFICE.

EDWIN E. SLICK, OF PITTSBURGH, PENNSYLVANIA.

PLATE MOLD AND METHOD OF MAKING PLATES.

Application filed October 12, 1927. Serial No. 225,684.

The present invention relates broadly to the art of plastics and plastic handling, and more particularly to an improved method and apparatus for the production of plates and similar articles from plastic materials adapted to flow under predetermined conditions of temperature and pressure.

While the specification will hereinafter refer more particularly to the production of plates, it will be understood that this term is used in its generic sense as definitive of and inclusive of such articles as saucers, platters, trays and the like, and is not used as a word of limitation. It will also be apparent that while the invention is particularly adapted to the manufacture of articles of glassware, its utility is in no wise limited in this respect.

At the present time it is customary in the art to which the present invention relates to produce articles of the character herein contemplated by the formation of a blank comprising a body having upstanding edges, and then rotating the body while at a high enough temperature to permit deformation thereof, and deforming the upstanding edges into approximately the shape desired. In order to effectively carry out this operation, it is necessary for the operator to be experienced in order to insure substantial uniformity between successive articles produced. It is also necessary to produce blanks having edge portions of greater thickness than required in the finished article in order to provide the necessary strength for the shaping step.

In accordance with the present invention I preferably provide a blank or charge of glass or other plastic material and subject the same to a pressing and shaping operation under such conditions as to form a finished article having not only more pleasing appearance, but of a shape identically like that of other articles produced by the same process.

In the accompanying drawings I have shown, for purposes of illustration only, a preferred apparatus for carrying out the present invention, it being understood that the drawings do not define the limits of my invention, as changes in the construction of the mold parts, as well as in the contour, configuration and arrangement thereof, may be made without departing either from the spirit of the present invention or the scope of my broader claims.

The figure of the drawings is a transverse sectional view through a mold constructed in accordance with my invention, and having a formed article in position therein.

In carrying out the present invention there may be provided a mold comprising a base 2 with body forming members 3 and 4 thereon. These members are preferably formed independently of the base in such manner that the member 3 comprises a substantially ring-shaped body for the production of the under side of the flange of the finished article, as will hereinafter be more fully apparent, while the member 4 forms the under side of the main body of such article. The forming ring 3 is preferably shaped to provide an internal shoulder 5 and an external shoulder 6, the shaping member being similarly formed to provide a shoulder 7 for cooperation with the shoulder 5. The base 2 is conveniently formed with a central opening or openings 8 through which means may be inserted for producing a movement of the member 4 relatively to the member 3 to the extent permitted by the space between the shoulders 5 and 7, to thereby produce the ejection of a formed article A from the mold.

For cooperation with the parts already described, there is provided a press head H having its lower surface adapted to form the entire upper side of the article, and preferably of such dimensions as to project beyond the article as clearly indicated in the drawings.

It has heretofore been proposed to form articles of the general character herein contemplated, in molds by the application of pressure. So far as I am aware, however, effective means have not been provided for insuring exact equality in the diameters of successive articles, or preventing the finning of the edge portions. In accordance with the present invention, by reason of the relative size of the press head H, as compared to the size of members 3 and 4, it is possible to form the head in such manner that the diameter of the article is positively limited, or to provide an edge shaping ring for this purpose. In the embodiment illustrated in the single figure of the drawings there is shown an edge shaping ring 9, surrounding the forming ring 3, and provided on one of its inner edges with an inwardly projected shoulder 10, adapted for cooperation with the shoulder 6, whereby axial movement of the ring 9 in an outward direction with respect to the ring 3 is definitely limited. The base 2 and the ring 9 are preferably each provided with a series of recesses 11 for the reception of compression springs 12, by means of which the edge shaping ring is normally urged outwardly relatively to the base. Any desired number of such springs may be provided in accordance with the particular design of the mold and the use to which it is to be put.

With a construction of the character referred to, the descent of the head H causes it to contact with the upper surface of the edge shaping ring 9 before the completion of the pressing operation. By properly choosing the springs 12 the joint 13 between the head and the edge shaping ring can be maintained sufficiently tight to prevent the glass from finning out. The springs 12 also compensate for any slight difference in the weights of the gathers or charges used for the formation of the articles since they will yield to a greater or less extent depending upon the amount the head H is permitted to descend. As the pressure exerted by the head is gradually increased, the glass or other plastic material will flow laterally in the direction indicated by the arrows 14, to the extent permitted by the edge retaining means, thereby forming uniform edges of proper size.

The actual descent of the press head is preferably limited only by the actual amount of plastic material placed within the mold. In accordance with the present invention it is possible to produce a succession of articles all having the same contour and dimensions. It is also possible to produce in large quantities articles less massive, at least with respect to thickness, than those heretofore produced for the same purpose, and having their attractiveness correspondingly increased.

I claim:—

1. A plate mold comprising a base, an ejecting and shaping block supported thereon, a shaping ring surrounding said block, a yieldingly supported means for limiting the maximum diameter of an article being formed, and a press head for subjecting the article to pressure.

2. A plate mold comprising a base, an ejecting and shaping block supported thereon, a shaping ring surrounding said block, a yieldingly supported means for limiting the maximum diameter of an article being formed, and a press head for subjecting the article to pressure, said yieldingly supported means comprising a spring press ring surrounding the shaping ring and movable in an axial direction relative thereto.

3. A plate mold comprising bottom forming means, top forming means, and means yieldingly mounted for movement with the top forming means for positively controlling the outside dimension of the article, said top forming means comprising a press head movable to exert the desired pressure on the article.

4. A plate mold comprising a base, an ejecting block supported thereon, a shaping ring surrounding said block, a press head for subjecting the article to pressure, and spring pressed means for positively limiting the outside diameter of said article under pressure.

5. A plate mold comprising a bottom forming means, a top forming means, and a yieldingly supported ring for limiting outside dimensions of the article, said ring moving with one of the forming means.

6. A plate mold comprising a bottom forming means, a top forming means, and a spring pressed ring for controlling variations in the charge of plastic material.

7. In the method of producing plate like articles, the steps comprising subjecting a charge of plastic material to pressure, producing a lateral flow of the plastic material outwardly to form a flange, positively limiting the outward flow to thereby control the outer edge of the article, and variably positioning the limiting means in accordance with the charge of plastic material.

In testimony whereof I have hereunto set my hand.

EDWIN E. SLICK.